US010754871B2

United States Patent
Laurent et al.

(10) Patent No.: US 10,754,871 B2
(45) Date of Patent: Aug. 25, 2020

(54) CONTEXT-SENSITIVE DATA RETRIEVAL AND CONVERSION

(71) Applicant: Oracle International Corporation, Redwood Shores, CA (US)

(72) Inventors: Nicole Jodie Laurent, Lakewood, CO (US); Darryl Martin Shakespeare, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 15/831,497

(22) Filed: Dec. 5, 2017

(65) Prior Publication Data

US 2019/0171751 A1   Jun. 6, 2019

(51) Int. Cl.
*G06F 16/25* (2019.01)
*G06F 16/242* (2019.01)
*G06F 16/2457* (2019.01)

(52) U.S. Cl.
CPC .......... *G06F 16/258* (2019.01); *G06F 16/244* (2019.01); *G06F 16/24575* (2019.01)

(58) Field of Classification Search
CPC .................................................. G06F 16/258
See application file for complete search history.

(56) References Cited

U.S. PATENT DOCUMENTS

| | | | | | |
|---|---|---|---|---|---|
| 3,851,151 A | * | 11/1974 | Stambera | ............. | G01G 19/415 235/375 |
| 5,897,621 A | * | 4/1999 | Boesch | .................. | G06Q 20/02 235/379 |
| 6,336,097 B1 | * | 1/2002 | Scipioni | ................. | G06Q 10/02 705/400 |
| 2002/0004750 A1 | * | 1/2002 | Zimmerman | ........ | G06Q 20/201 705/20 |
| 2002/0165821 A1 | * | 11/2002 | Tree | ....................... | G06Q 20/02 705/39 |
| 2004/0030632 A1 | * | 2/2004 | Hausman | ............. | G06Q 10/087 705/37 |
| 2011/0264625 A1 | * | 10/2011 | Samudrala | .............. | G06F 16/25 707/624 |
| 2014/0129400 A1 | * | 5/2014 | Armstrong | ............. | G06Q 30/04 705/34 |

OTHER PUBLICATIONS https://codereview.stackexchange.com/questions/177517/converting-local-currencies-into-one-target-currency-using-the-exchange-rate-tab (Year: 2017).*

* cited by examiner

*Primary Examiner* — William Spieler
(74) *Attorney, Agent, or Firm* — Invoke

(57) ABSTRACT

Techniques for context-sensitive data retrieval and conversion are disclosed. A system receives a request for data in a first data format. A first subset of records includes a first subset of data in the first data format. A second subset of the records includes a second subset of data in a second data format. The system determines a context-sensitive operation for converting data. The system transmits a query including an aggregation clause associated with the context-sensitive operation. The system receives aggregated results including: aggregated data from the first subset of records, in the first data format; and aggregated data from the second subset of records, in the second data format. Using the context-sensitive operation, the system converts data from the second data format to the first data format. A response to the request is based on the aggregated data from the first subset of records and the converted aggregated data.

20 Claims, 5 Drawing Sheets

| Amount | Business_Unit_ID |
|---|---|
| 10.01 | 1 |
| 3197 | 2 |
| 8973 | 2 |
| 15.23 | 1 |
| 15.23 | 1 |
| 200.00 | 1 |

FIG. 3C

| Amount | Business_Unit_ID |
|---|---|
| 240.47 | 1 |
| 12170 | 2 |

FIG. 3D

| Amount | Business_Unit_ID | Currency |
|---|---|---|
| 240.47 | 1 | USD |
| 12170 | 2 | YEN |

FIG. 3E

| Amount | Currency |
|---|---|
| 240.47 | USD |
| 12170 | YEN |

FIG. 3F

| Amount | Currency |
|---|---|
| 240.47 | USD |
| 107.05 | USD |

FIG. 3G

| Amount |
|---|
| 347.52 |

CONTEXT-SENSITIVE DATA RETRIEVAL AND CONVERSION

TECHNICAL FIELD

The present disclosure relates to data. In particular, the present disclosure relates to data retrieval and conversion.

BACKGROUND

A data repository may include records storing data of similar types, but in different data formats. The different data formats may not be directly compatible or interchangeable with each other. In an example, a data repository includes fitness data. The records include individuals' weights in different units, such as pounds, kilograms, stones, etc. In another example, a data repository includes financial data. The records include transaction amounts in different currencies, such as U.S. dollar, Euro, Japanese yen, Swiss franc, etc. In another example, a data repository includes vehicle data. The records include vehicles' top speeds in different units, such as miles per hour, kilometers per hour, knots, etc. In another example, a data repository includes inventory data. The records include amounts of inventory in different units, such as ounces, pounds, kilograms, etc. Data of many different similar types may be stored in many different data formats.

When a data repository includes records storing data in different formats, obtaining data in a particular format typically involves retrieving all of the corresponding records from the data repository. For each record where the data is not in the desired format, obtaining the data further involves converting the data from the format in which it was stored to the desired format. As the number of records increases, the computing resources needed to retrieve each record and convert data to the required format increases. Depending on the number of records, retrieving all the records and converting data to the required format may be unacceptably inefficient or even impracticable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. CONTEXT-SENSITIVE DATA RETRIEVAL AND CONVERSION
4. ILLUSTRATIVE EXAMPLE
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments include techniques for context-sensitive data retrieval and conversion. A system uses contextual data to retrieve data in a particular format and convert the data to a different format, even when an explicit indication of the data's original format may not be available. The system receives a request to retrieve data from a data repository. The request indicates that the data should in a particular data format. In the data repository, a subset of records includes a subset of the data already in the requested data format. Another subset of the records includes another subset of the data in a data format that is different from the requested data format. Based on the request, the system determines a context-sensitive operation for converting data from the different data format to the requested data format. The system transmits, to the data repository, a query that includes at least one aggregation clause associated with the context-sensitive operation. Responsive to the query, the system receives results aggregated according to the aggregation clause(s). The results include aggregated data from the subset of records in the requested data format and aggregated data from the subset of records in the different data format. Using the context-sensitive operation, the system converts aggregated data from the different data format to the requested data format. The system generates a response to the request, based on the aggregated data that was already in the requested data format and the converted aggregated data.

In an embodiment, a context-sensitive operation is an operation that is based on contextual information associated with the request. The context-sensitive operation allows the application server to infer the data format of retrieved data and, based on that inference, convert the retrieved data to the requested data format. Using a context-sensitive operation, the application server may not require information that explicitly identifies the data format in which the data was retrieved. The application server may use many different context-sensitive operations and/or combinations thereof.

One or more embodiments described in this Specification and/or recited in the claims may not be included in this General Overview section.

2. Architectural Overview

Figure 1:
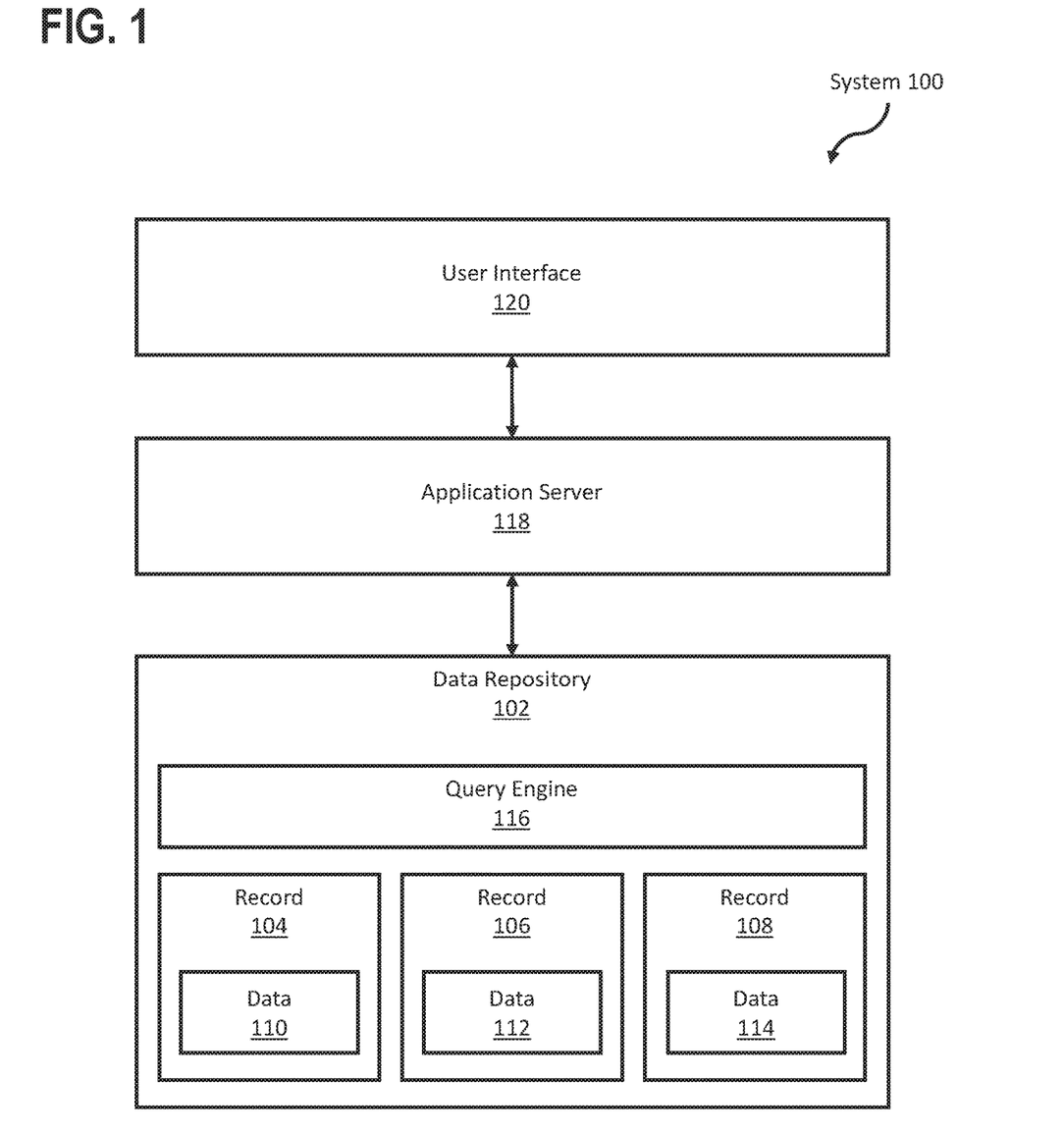
FIG. 1 is a block diagram illustrating a system in accordance with one or more embodiments.

FIG. 1 is a block diagram illustrating a system 100 in accordance with one or more embodiments. As illustrated in FIG. 1, system 100 includes a user interface 120, an application server 118, a data repository 102, and one or more components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In one or more embodiments, a data repository 102 is any type of storage unit and/or device (e.g., a file system, database, collection of tables, or any other storage mechanism) for storing data. Further, the data repository 102 may include multiple different storage units and/or devices. The multiple different storage units and/or devices may or may not be of the same type or located at the same physical site. Further, the data repository 102 may be implemented or may execute on the same computing system as the application server 118 and/or user interface 120. Alternatively or additionally, the data repository 102 may be implemented or executed on a computing system separate from the application server 118 and/or user interface 120. The data repository 102 may be communicatively coupled to the application server 118 via a direct connection or via a network.

In an embodiment, the data repository 102 stores multiple records (e.g., records 104, 106, 108). The data repository 102 may store records as files, database rows, objects in cloud storage, and/or as any other type of storage format or configuration in which one record is distinguishable from another record. Specifically, each record includes data (e.g., data 110, 112, 114). The data may be stored in many different data formats, such as different number formats, character formats, file formats, etc. Different records may include data in different data formats. In an example, the data repository 102 includes fitness data. The data 110, 112, 114 include individuals' weights in different units, such as pounds, kilograms, stones, etc. In another example, the data repository 102 includes financial data. The data 110, 112, 114 include transaction amounts in different currencies, such as U.S. dollar, Euro, Japanese yen, Swiss franc, etc. In another example, the data repository 102 includes vehicle data. The data 110, 112, 114 include vehicles' top speeds in different units, such as miles per hour, kilometers per hour, knots, etc. In another example, the data repository 102 includes inventory data. The data 110, 112, 114 include amounts of inventory in different units, such as ounces, pounds, kilograms, etc. The data 110, 112, 114 may include many different types of data in many different data formats.

In an embodiment, one or more records include information that explicitly identifies the data format(s) of data in the record(s). Alternatively or in addition, one or more records may not include information that explicitly identifies the data format(s) of data in the record(s). The records may include a combination of one or more records that explicitly identify the corresponding data format(s) and one or more records that do not explicitly identify the corresponding data format(s). For one or more records, the system 100 may use contextual information, rather than information that explicitly identifies a data format, to determine the data format(s) of the data in the record(s). Specifically, the system 100 may determine the data format(s) based on other information that may be stored in the records, such as company identifiers, business unit identifiers, account identifiers, or any other type of information that allows the system 100 to differentiate between different data formats of records.

In an embodiment, the application server 118 and/or data repository 102 store other types of information related to the record(s). The application server 118 and/or data repository 102 may store information used to convert from one data format to another, such as currency exchange rates and/or conversion factors for different units of measurement. For currency exchange rates, application server 118 and/or data repository 102 may store effective dates (i.e., the date(s) for which each particular exchange rate is applicable), a "from" currency, a "to" currency, a conversion factor, and/or information about whether the "from" currency should be multiplied or divided by the conversion factor to obtain the "to" currency. A user of the application server may be able to provide input specifying a particular date, or range of dates, for which to retrieve financial data. The application server would then use the applicable conversion rate(s) for the financial data corresponding to those date(s). If no date or date range is specified, the application server may use the conversion rate(s) for the present date by default. Alternatively or in addition, the application server 118 and/or data repository 102 may store information about how to visually represent different data formats. Different currencies may treat decimal places differently, for example; one currency may not use decimal places while another currency may use one or more decimal places. U.S. dollars typically are represented with two decimal places corresponding to cents. The number of decimal places also is relevant to mathematical operations, to ensure that currency conversions are not misrepresented by a one or more factors of ten.

In one or more embodiments, the application server 118 and data repository 102 refer to hardware and/or software configured to perform operations described herein for context-sensitive data retrieval and conversion. Examples of operations for context-sensitive data retrieval and conversion are described below.

In an embodiment, the data repository 102 includes a query engine 116. The data repository 102 may be configured to receive a query from the application server 118 and return data to the application server 118 responsive to the query. The query engine 116 may be configured to process the query and determine which data to return to the application server 118. Alternatively or in addition, the query engine 116 may be configured to aggregate data according to one or more aggregation clauses in the query. Alternatively or in addition, the query engine 116 may be configured to convert aggregated data from one data format to another data format. Alternatively or in addition, the application server 118 may be configured to convert data, aggregated by the query engine 116, from one data format to another data format.

In an embodiment, components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/ or transmitter, a base station, a communication management device, a router, a switch, a controller, an access point, and/or a client device.

In one or more embodiments, a user interface 120 refers to hardware and/or software configured to facilitate communications between a user and an application server 118. The user interface 120 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 120 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 120 may be specified in one or more other languages, such as Java, C, or C++.

3. Context-Sensitive Data Retrieval and Conversion

Figure 2:
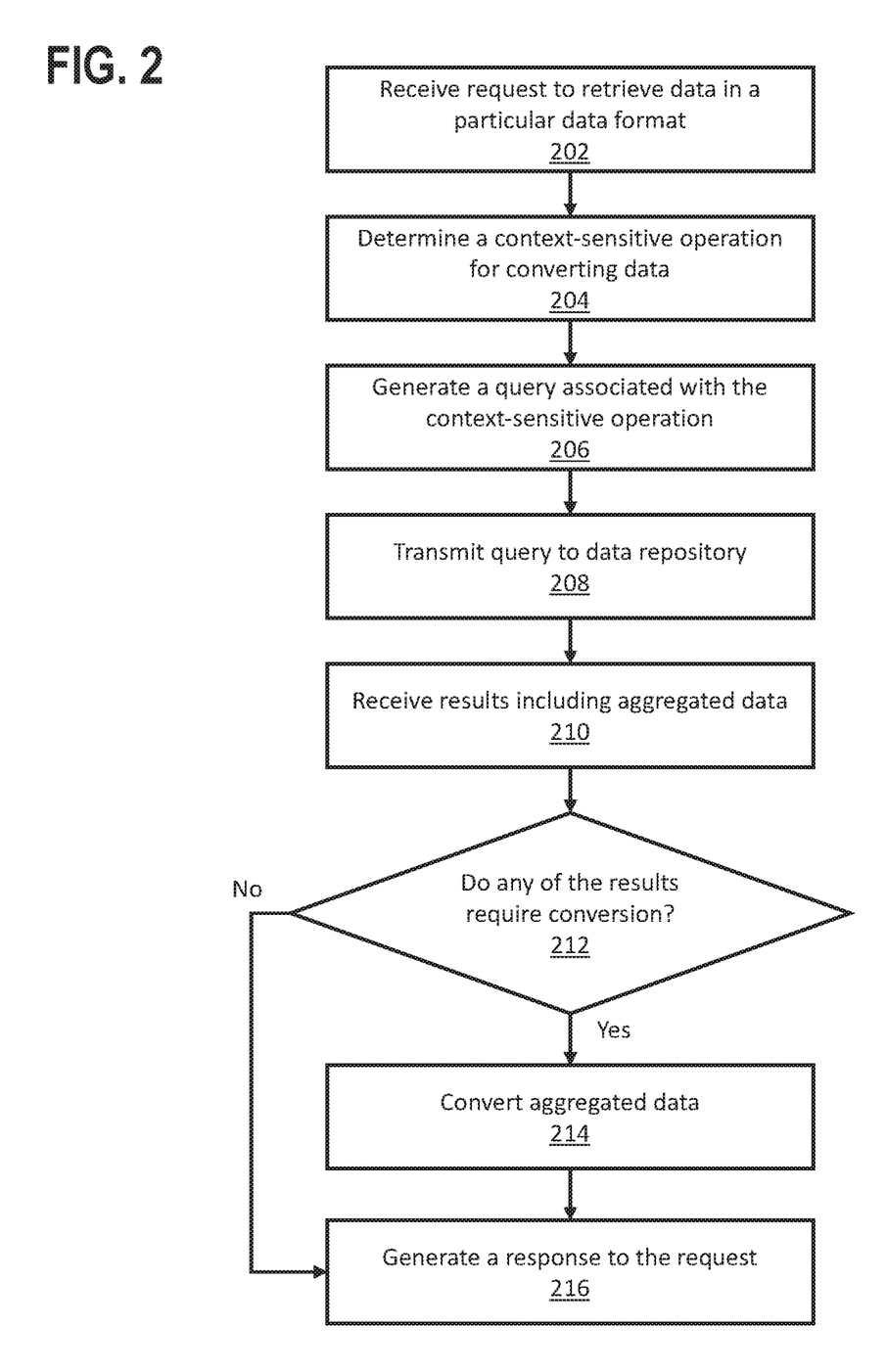
FIG. 2 illustrates a set of operations for context-sensitive data retrieval and conversion in accordance with one or more embodiments.

FIG. 2 illustrates an example set of operations for context-sensitive data retrieval and conversion in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. The following discussion refers to operations performed by one or more components of a system described above. In an embodiment, one or more operations are performed by different components and/or a different combination thereof.

In an embodiment, an application server receives a request to retrieve data in a particular data format (Operation 202). The application server may receive a request to retrieve weight data in a particular weight unit, financial data in a particular currency, speed data in a particular speed unit, inventory data in a particular weight unit, or any other type of data in a particular data format. The application server may receive the request as user input to a user interface of the application server. The request may indicate a specific date or date range of data to be retrieved. Alternatively or in addition, the request may include one or more filtering criteria to be applied to the data, such as a particular company, business unit, etc. As discussed below, the request may also indicate a particular context-sensitive operation to use when converting data responsive to the request.

In an embodiment, the application server determines a context-sensitive operation for converting data (Operation 204). A context-sensitive operation is an operation that is based on contextual information associated with the request. The context-sensitive operation allows the application server to infer the data format of retrieved data and, based on that inference, convert the retrieved data to the requested data format. Using a context-sensitive operation, the application server may not require information that explicitly identifies the data format in which the data was retrieved. A context-sensitive operation may be a composite operation, having multiple sub-operations. For example, a context-sensitive operation may include conditional logic so that the application server converts data in different ways, depending on contextual data associated with the retrieved data. The application server may inspect the retrieved data and, for each result in the retrieved data, determine whether to apply one type of conversion or another type of conversion. For data returned from a database, the determination may be based on a particular column in the results. In an embodiment, the application server uses multiple context-sensitive operations, each context sensitive-operation applying to a different subset of the retrieved data. For example, one subset of the results may be converted based on a company identifier, while another subset of the results may be converted based on a business unit identifier. The application server may use many different context-sensitive operations and/or combinations thereof.

The following examples, provided for explanatory purposes, involve a data repository storing records of financial transactions (e.g., purchases, sales, interest, dividends, taxes, etc.). In these examples, the application server has received a request for financial transaction data in a particular currency. However, examples may be equally applicable to a data repository storing another type of data, and/or different types of requests.

In an example, records include company identifiers that uniquely identify the company(ies) on one or both sides of the corresponding financial transaction(s). A company identifier may be a company name, a reference to another record in the data repository (e.g., a record in a companies table in a relational database), or any other type of identifier that uniquely identifies a particular company. A company may be a corporation, a limited liability company, a partnership, a sole proprietorship, or any other type of uniquely identifiable company. If each company is known to use a particular currency, then the currency of a financial transaction may be inferred from its corresponding company identifier. The appropriate currency conversion rate, from the retrieved currency to the requested currency, may also be inferred.

In another example, records include business unit identifiers that uniquely identify the business unit(s) on one or both sides of the corresponding financial transaction(s). A business unit identifier may be a business unit name, a reference to another record in the data repository (e.g., a record in a business units table in a relational database), or any other type of identifier that uniquely identifies a particular business unit. A business unit may be a subsidiary, a department, a working group, a field office, or any other type of uniquely identifiable business unit. If each business unit is known to use a particular currency, then the currency of a financial transaction may be inferred from its corresponding business unit identifier. The appropriate currency conversion rate, from the retrieved currency to the requested currency, may also be inferred.

In another example, records include account identifiers that uniquely identify the financial account(s) on one or both sides of the corresponding financial transaction(s). An account identifier may be an account name, a reference to another record in the data repository (e.g., a record in an accounts table in a relational database), or any other type of identifier that uniquely identifies a particular financial account. An account may be a credit card account, a checking account, a savings account, an investment account, or any other type of uniquely identifiable financial account. If each account is known to use a particular currency, then the currency of a financial transaction may be inferred from its corresponding account identifier. The appropriate currency conversion rate, from the retrieved currency to the requested currency, may also be inferred.

In another example, records include ledger information. Ledger information may indicate whether a transaction is associated with a master ledger or subsidiary ledger, and/or may indicate a particular subsidiary ledger with which a transaction is associated (e.g., sales ledger or purchase ledger). An given organization may use many different ledgers and/or subsidiary ledgers. A context-sensitive operation may be based on the particular ledger type associated with the record(s).

In another example, a context-sensitive operation includes conditional logic. The conditional logic based on the ledger type(s) of one or more records. A master ledger may be associated with a particular company and/or business unit. If a particular record is associated with a master ledger, and/or if no ledger type is specified for a result, the context-sensitive operation may infer a currency based on the associated company and/or business unit. If the record is not associated with a master ledger, the context-sensitive operation may attempt to infer the currency from another source, such as a currency code explicitly associated with that particular record. Alternatively or in addition, the condition logic may be based on currency modes associated with different companies and/or business units. Depending on the currency mode for the particular company and/or business unit associated with a result, the context-sensitive operation may either convert data based on the company and/or business unit, or the context-sensitive operation may attempt to infer the currency from another source. Alternatively or in addition, if a currency is known for an account with which a record is associated, the account currency may be used. If the account currency is not known, other contextual information, such as a company associated with the record, may be used. Alternatively or in addition, the context-sensitive information may attempt to infer the currency based on a supplier associated with a record, or from another source if supplier information is not available. Many different types of conditional logic may be used.

Embodiments should not be considered limited to company identifiers, business unit identifiers, and/or account identifiers. Many different kinds of information may be used as the basis for determining a context-sensitive operation for converting the corresponding data.

In an embodiment, to determine a context-sensitive operation, the application server receives input via a user interface. Returning to the examples above, a user of the application server may manually indicate, via the user interface, that financial transactions should be retrieved and converted based on company identifiers, business unit identifiers, account identifiers, and/or some other contextual information from which the currency (and corresponding conversion rate) of each transaction may be inferred. Alternatively or in addition, the application server may default to a particular context-sensitive operation. The application server may automatically (i.e., without requiring user input) default to using different context-sensitive operations in different situations, such as different screens in a graphical user interface (GUI).

In an embodiment, the application server generates a query associated with the context-sensitive operation (Operation 206). Specifically, the application server generates a query that includes one or more clauses requesting information that supports the particular context-sensitive operation. If the context-sensitive operation is based on company identifiers, then the application server generates a query with a clause that requests company identifiers for the records retrieved. If the context-sensitive operation is based on business unit identifiers, then the application server generates a query with a clause that requests business unit identifiers for the records retrieved. If the context-sensitive operation is based on account identifiers, then the application server generates a query with a clause that requests account identifiers for the records retrieved. Depending on the context-sensitive operation, many different kinds of clauses may be added to the query.

In an embodiment, the application server includes one or more aggregation clauses in the query. An aggregation clause is a clause that instructs the data repository to aggregate the data from multiple records, rather than return the data separately. Data from a large number of records may be summed, averaged, or otherwise aggregated and returned as a smaller number (perhaps only one) of results. Returning to the examples above, the aggregation clause may instruct the data repository to sum financial transactions for each unique company identifier, business unit identifier, and/or account identifier.

In an embodiment, the application server transmits the query to the data repository (Operation 208). In response to the query, the application server receives results, from the data repository, including aggregated data (Operation 210). Specifically, the results are aggregated according to the clause that the application server included in the query, based on the context-sensitive operation.

In an embodiment, the application server determines whether any of the results require conversion (Operation 212). If a particular result is not already in the requested data format, that particular result requires conversion to the requested data format. Returning to the example above, if financial transactions associated with a particular company, business unit, or account are in a currency that is different from the requested currency, then those financial transactions require conversion to the requested currency.

In an embodiment, if no results require conversion to the requested data format, then the application server proceeds to generate a response to the request (Operation 216) as described below. If a particular result does require conversion to the requested data format, then the application server converts that result (which includes aggregated data, as discussed above), to the requested data format (Operation 214). The application server may convert weight data to a particular weight unit, financial data to a particular currency, speed data to a particular speed unit, inventory data to a particular weight unit, etc. Because the application server converts aggregated data, the conversion process may be much more efficient than if the application server were to retrieve and convert the data from each record individually.

In an embodiment, when the results are in the requested data format, the application server generates a response to the request (Operation 216). The response to the request may involve presenting the results to a user, in a user interface of the application server. The application server may format the results for readability and/or usability. Alternatively and/or in addition, the application server may modify the results by removing extraneous information. Information that the application server removes may include information that was retrieved in support of the context-sensitive operation, but that was not requested. For example, the application server may omit company identifiers, business unit identifiers, account identifiers, etc., from the response.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
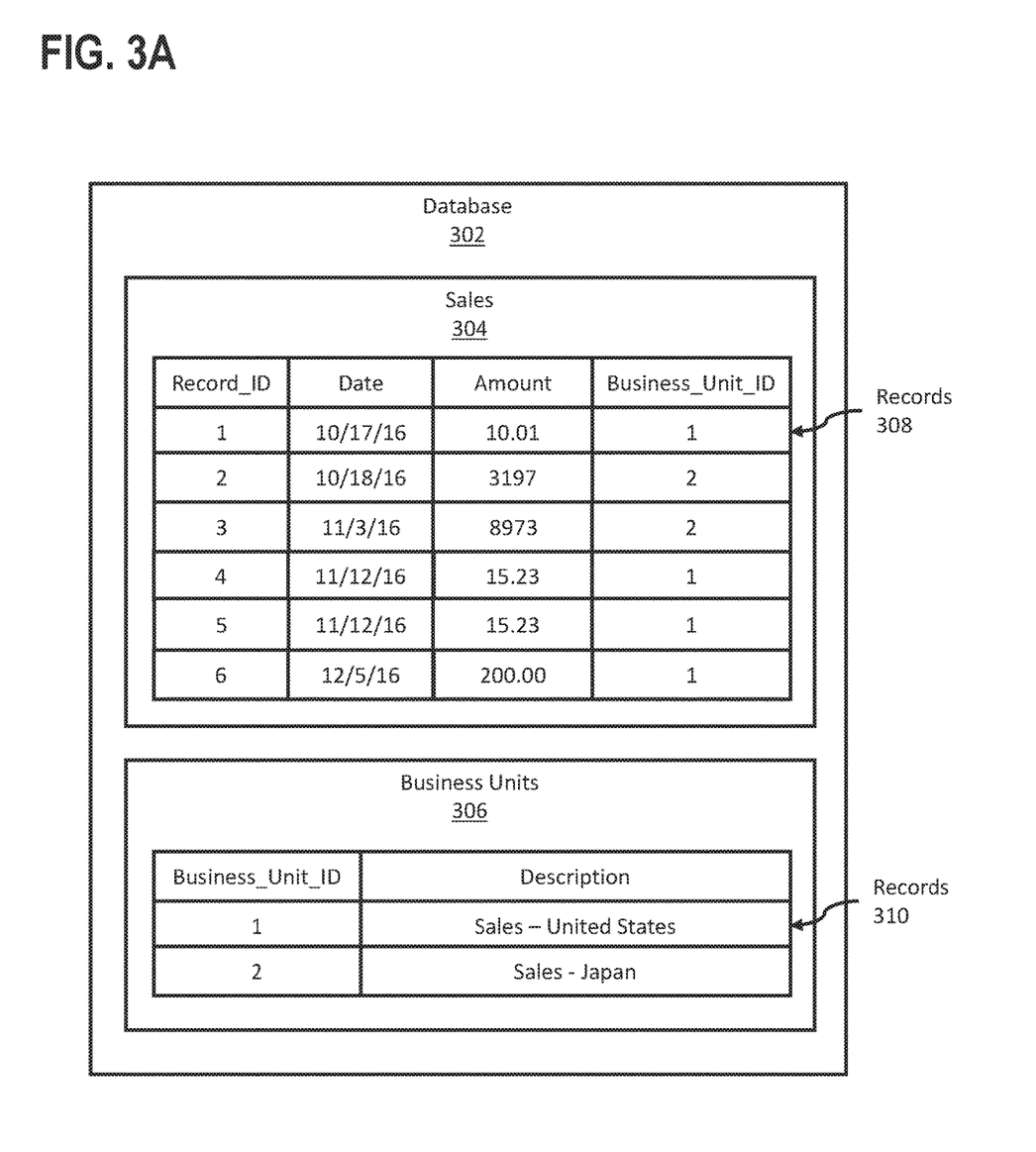
FIG. 3A-3G are block diagrams illustrating an example in accordance with one or more embodiments.

FIGS. 3A-3G are block diagrams illustrating an example in accordance with one or more embodiments. As illustrated in FIG. 3A, a database 302 includes a sales table 304. The sales table 304 includes multiple records 308 corresponding to financial transactions (in this examples, business sales). Each record includes a record identifier (ID) that uniquely identifies the record in the sales table 304. a date of the transaction, and an amount of the transaction in an unspecified currency. In addition, each record includes a business unit identifier (ID) corresponding to a business unit to which the sale is attributed.

In this example, the database 302 is a relational database. Each business unit ID in the sales table 304 relates to a business unit ID in a business units table 306. The records 310 in the business units table 306 include additional information about each business unit, such as a description. In this example, there are two business units: a sales unit for the United States and a sales unit for Japan. It may be reasonably inferred that the sales unit for the United States (business unit ID number 1) transacts sales in U.S. dollars, while the sales unit for Japan transacts sales in Japanese yen.

FIGS. 3B-3G illustrate, in diagram form, a process of requesting sales data from the database 302 of FIG. 3A and applying a context-sensitive operation to convert the sales data to a requested currency. An application server receives a request for sales data in U.S. dollars. To infer the currency of sales data and apply any required currency conversions, the application server selects a context-sensitive operation based on business units. The application server transmits a query to the database 302 that includes one or more clauses to aggregate the results by business unit. For example, the application server may generate a structured query language (SQL) query such as: "SELECT SUM (Amount), Business_Unit_ID FROM Sales GROUP BY Business_Unit_ID." The application server transmits the query to the database 302.

Figure 3B:
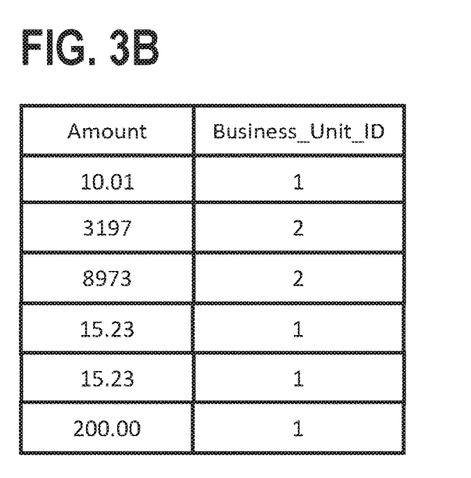
Figure 3C:
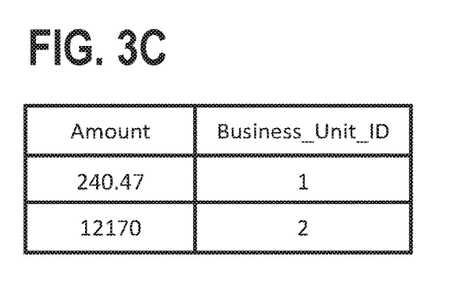

FIG. 3B shows results that the database 302 may have returned, in response to the query from the application server, if the aggregation clause(s) had not been included. In FIG. 3C, the aggregation clauses have been applied, so that there are only two aggregated results: an aggregated total amount of sales for business unit 1 (U.S. sales) and an aggregated total amount of sales for business unit 2 (Japanese sales). In general, it may be more efficient for a database to aggregate data before returning the data to an application server. Aggregating data at the database may reduce the amount of time, processing cycles, network bandwidth, and/or other system resources needed to return results to the application server. In this example, the database returns two aggregated results instead of six non-aggregated results, and the application sever is spared the resources that would otherwise be needed to receive the results, group the results by business unit ID, and sum the results.

Figure 3D:
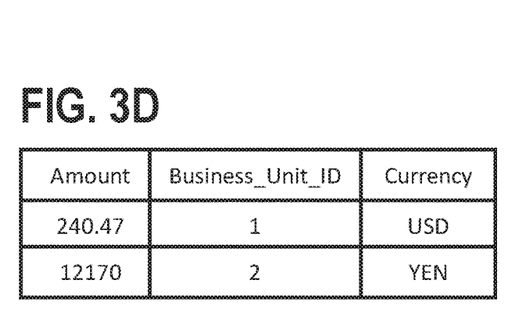
Figure 3E:
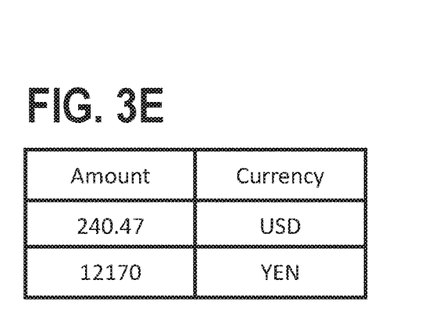
Figure 3F:
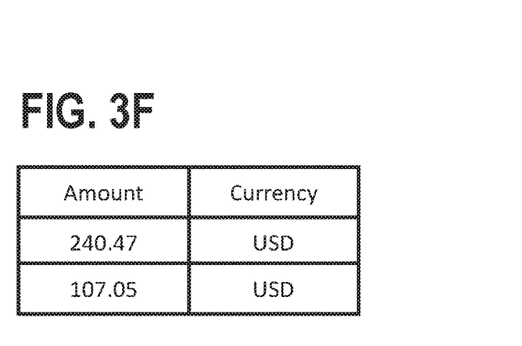
Figure 3G:
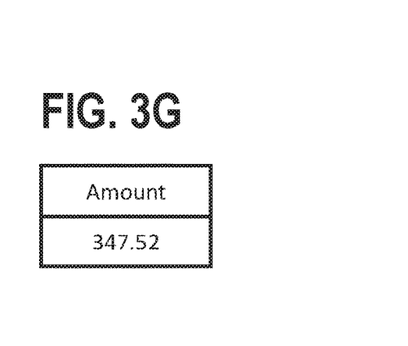

In FIG. 3D, the application server has applied the context-sensitive operation to determine the currencies of each aggregated result. Specifically, the application server has augmented the aggregated results with a currency column, indicating the currency corresponding to each business unit. These application server may obtain these currencies from the database 302 (for example, from a field in the business units table 306), and/or by inference using business logic built into the application server. In FIG. 3E, the application server has discarded the Business_Unit_ID column, because that column is no longer needed to infer the currencies of the aggregated results. In FIG. 3F, the application server has converted the second aggregated result from Japanese yen to U.S. dollars. In FIG. 3G, the application server has summed the two results to obtain a total sales amount expressed in U.S. dollars.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
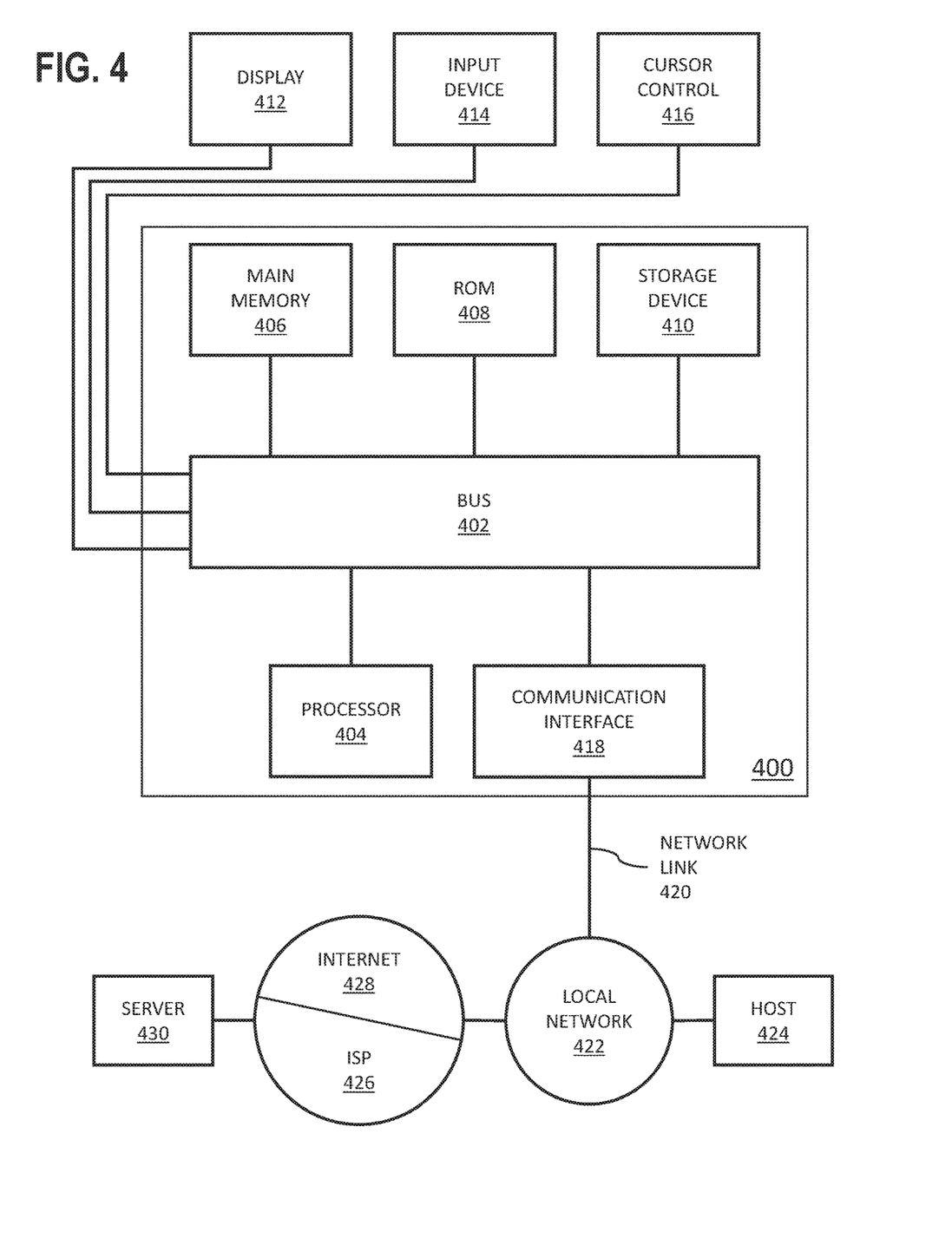
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   receiving a request to retrieve data from a data repository in a first data format;
      wherein a first subset of a plurality of records, in a multi-format data table, comprises a first subset of the data in the first data format,
      wherein the first subset of the plurality of records does not explicitly identify the first data format corresponding to the first subset of the data;
      wherein a second subset of the plurality of records, in the same multi-format data table, comprises a second subset of the data in a second data format that is different from the first data format,
      wherein the second subset of the plurality of records does not explicitly identify the second data format corresponding to the second subset of the data;
   based on additional information in each of the second subset of the plurality of records:
      inferring the second data format corresponding to the second subset of data, wherein the additional information in each of the second subset of the plurality of records does not explicitly identify the second data format corresponding to the second subset of the data;
   determining, based on the second data format inferred from the additional information in the second subset of the plurality of records, a first context-sensitive operation for converting at least the second subset of data to the first data format;
   executing a query comprising at least one aggregation clause associated with the first context-sensitive operation;
   receiving, responsive to the query, a plurality of results aggregated according to the at least one aggregation clause,
      wherein a first result in the plurality of results comprises first aggregated data, from the first subset of the plurality of records, in the first data format, and
      wherein a second result in the plurality of results comprises second aggregated data, from the second subset of the plurality of records, in the second data format;
   converting, using the first context-sensitive operation, the second aggregated data from the second data format to the first data format to obtain first converted aggregated data; and
   generating a response to the request, based on the first aggregated data and the first converted aggregated data.

2. The medium of claim 1,
   wherein a third subset of the plurality of records, in the multi-format data table, comprises a third subset of the data in a third data format that is different from the first data format and the second data format,
   wherein the third subset of the plurality of records does not explicitly identify the third data format corresponding to the third subset of the data;
   based on additional information in each of the third subset of the plurality of records:
      inferring the third data format corresponding to the third subset of data, wherein the additional information in each of the third subset of the plurality of records does not explicitly identify the third data format corresponding to the third subset of the data;
   determining, based on the third data format inferred from the additional information in the third subset of the plurality of records, a second context-sensitive operation for converting at least the third subset of data to the first data format;
   wherein a third result in the plurality of results comprises third aggregated data, from the third subset of the plurality of records, in the third data format,
   the operations further comprising:
      converting, by the second-context sensitive operation, the third aggregated data from the third data format to the first data format to obtain second converted aggregated data,
   wherein the response to the request is further based on the second converted aggregated data.

3. The medium of claim 1, wherein generating the response to the request comprises
   aggregating the first aggregated data and the first converted aggregated data to obtain total aggregated data.

4. The medium of claim 1, wherein the response comprises both the first aggregated data and the second aggregated data.

5. The medium of claim 1, wherein the response comprises an aggregation of the first aggregated data and the second aggregated data.

6. The medium of claim 1, wherein the first context-sensitive operation is based at least in part on a plurality of company identifiers stored, respectively, in each record in the plurality of records.

7. The medium of claim 1, wherein the first context-sensitive operation is based at least in part on a plurality of business unit identifiers stored, respectively, in each record in the plurality of records.

8. The medium of claim 7, wherein the business unit is one or more of a business unit identifier, a department identifier, or a field office identifier.

9. The medium of claim 1, wherein the first context-sensitive operation is based at least in part on a plurality of account identifiers stored, respectively, in each record in the plurality of records.

10. The medium of claim 1, wherein based on a value of at least one contextual field of a particular record in the plurality of records, the first context-sensitive operation applies either a first conversion rule or a second conversion rule to data in the particular record.

11. The medium of claim 1, wherein the first data format comprises a first currency and the second data format comprises a second currency.

12. The medium of claim 11, wherein the request comprises a particular date, wherein converting the second aggregated data from the second currency to the first currency comprises applying a currency conversation rate as of the particular date.

13. The medium of claim 1, wherein the additional information of the first context-sensitive operation is a ledger type associated with a transaction.

14. The medium of claim 13, wherein the leger type is a master ledger or a subsidiary ledger.

15. A system comprising:
one or more hardware processors; and
one or more one or more non-transitory computer-readable media storing instructions, which when executed by the one or more hardware processors, cause execution of operations comprising:
receiving a request to retrieve data from a data repository in a first data format;
wherein a first subset of a plurality of records, in a multi-format data table, comprises a first subset of the data in the first data format,
wherein the first subset of the plurality of records does not explicitly identify the first data format corresponding to the first subset of the data;
wherein a second subset of the plurality of records, in the same multi-format data table, comprises a second subset of the data in a second data format that is different from the first data format,
wherein the second subset of the plurality of records does not explicitly identify the second data format corresponding to the second subset of the data;
based on additional information in each of the second subset of the plurality of records:
inferring the second data format corresponding to the second subset of data, wherein the additional information in each of the second subset of the plurality of records does not explicitly identify the second data format corresponding to the second subset of the data;
determining, based on the second data format inferred from the additional information in the second subset of the plurality of records, a first context-sensitive operation for converting at least the second subset of data to the first data format;
executing a query comprising at least one aggregation clause associated with the first context-sensitive operation;
receiving, responsive to the query, a plurality of results aggregated according to the at least one aggregation clause,
wherein a first result in the plurality of results comprises first aggregated data, from the first subset of the plurality of records, in the first data format, and
wherein a second result in the plurality of results comprises second aggregated data, from the second subset of the plurality of records, in the second data format;
converting, using the first context-sensitive operation, the second aggregated data from the second data format to the first data format to obtain first converted aggregated data; and
generating a response to the request, based on the first aggregated data and the first converted aggregated data.

16. The system of claim 15,
wherein a third subset of the plurality of records, in the multi-format data table, comprises a third subset of the data in a third data format that is different from the first data format and the second data format,
wherein the third subset of the plurality of records does not explicitly identify the third data format corresponding to the third subset of the data;
based on additional information in each of the third subset of the plurality of records:
inferring the third data format corresponding to the third subset of data, wherein the additional information in each of the third subset of the plurality of records does not explicitly identify the third data format corresponding to the third subset of the data;
determining, based on the third data format inferred from the additional information in the third subset of the plurality of records, a second context-sensitive operation for converting at least the third subset of data to the first data format;
wherein a third result in the plurality of results comprises third aggregated data, from the third subset of the plurality of records, in the third data format,
the operations further comprising:
converting, by the second-context sensitive operation, the third aggregated data from the third data format to the first data format to obtain second converted aggregated data,
wherein the response to the request is further based on the second converted aggregated data.

17. The system of claim 15, wherein generating the response to the request comprises
aggregating the first aggregated data and the first converted aggregated data to obtain total aggregated data.

18. The system of claim 15, wherein the response comprises both the first aggregated data and the second aggregated data.

19. The system of claim 15, wherein the response comprises an aggregation of the first aggregated data and the second aggregated data.

20. A method comprising:
receiving a request to retrieve data from a data repository in a first data format;
wherein a first subset of a plurality of records, in a multi-format data table, comprises a first subset of the data in the first data format,
wherein the first subset of the plurality of records does not explicitly identify the first data format corresponding to the first subset of the data;
wherein a second subset of the plurality of records, in the same multi-format data table, comprises a second subset of the data in a second data format that is different from the first data format,
wherein the second subset of the plurality of records does not explicitly identify the second data format corresponding to the second subset of the data;

based on additional information in each of the second subset of the plurality of records:
  inferring the second data format corresponding to the second subset of data, wherein the additional information in each of the second subset of the plurality of records does not explicitly identify the second data format corresponding to the second subset of the data;
determining, based on the second data format inferred from the additional information in the second subset of the plurality of records, a first context-sensitive operation for converting at least the second subset of data to the first data format;
executing a query comprising at least one aggregation clause associated with the first context-sensitive operation;
receiving, responsive to the query, a plurality of results aggregated according to the at least one aggregation clause,
  wherein a first result in the plurality of results comprises first aggregated data, from the first subset of the plurality of records, in the first data format, and
  wherein a second result in the plurality of results comprises second aggregated data, from the second subset of the plurality of records, in the second data format;
converting, using the first context-sensitive operation, the second aggregated data from the second data format to the first data format to obtain first converted aggregated data; and
generating a response to the request, based on the first aggregated data and the first converted aggregated data,
wherein the method is performed by at least one device comprising a hardware processor.

* * * * *

UNITED STATES PATENT AND TRADEMARK OFFICE
CERTIFICATE OF CORRECTION

PATENT NO. : 10,754,871 B2
APPLICATION NO. : 15/831497
DATED : August 25, 2020
INVENTOR(S) : Laurent et al.

Page 1 of 1

It is certified that error appears in the above-identified patent and that said Letters Patent is hereby corrected as shown below:

In the Specification

In Column 1, Line 59, delete "FIG." and insert -- FIGS. --, therefor.

In Column 9, Line 10, delete "304." and insert -- 304, --, therefor.

In Column 9, Line 54, delete "sever" and insert -- server --, therefor.

In the Claims

In Column 18, Line 41, in Claim 2, delete "second-context sensitive" and insert -- second context-sensitive --, therefor.

In Column 19, Line 26, in Claim 15, delete "one or more one or more" and insert -- one or more --, therefor.

In Column 20, Line 36, in Claim 16, delete "second-context sensitive" and insert -- second context-sensitive --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*